United States Patent Office 3,539,297
Patented Nov. 10, 1970

3,539,297
PREVENTING CATALYST POISONING
BY SULFUR
Clyde L. Aldridge, Baton Rouge, La., assignor to Esso
Research and Engineering Company, a corporation of
Delaware
No Drawing. Filed Aug. 8, 1968, Ser. No. 719,680
Int. Cl. C01b 1/03
U.S. Cl. 23—213                                    10 Claims

ABSTRACT OF THE DISCLOSURE

The poisoning effect of sulfur on the activity of alkali metal salt catalysts in the water gas shift reaction is avoided by maintaining a concentration of carbon dioxide in the feed at a minimum of 5%.

BACKGROUND

The present invention relates to a method for eliminating the poisoning effect of sulfur on the activity of water gas shift catalyst, such as cesium salts.

It is well known to prepare hydrogen by reacting carbonaceous materials, such as hydrocarbons, with steam at elevated temperatures of 1200–1400° F., or coal or coke with steam at temperatures up to 2500° F., and then to react the resulting mixture of CO and $H_2$ with more steam at lower temperatures, for example about 700–900° F., in the presence of a suitable catalyst to convert the CO produced in the first stage to carbon dioxide and additional hydrogen. The second step, known as the water gas shift reaction, is limited by the equilibrium considerations and complete conversion of CO to $CO_2$ is not realized. The equilibrium concentration of CO can be decreased, however, by carrying out the shift reaction at temperatures between 400° and 700° F., preferably 500° to 650° F.

In copending application, Ser. No. 715,948, filed Mar. 26, 1968, for Clyde L. Aldridge it is shown that cesium salts derived from acids having ionization constants of less than $1 \times 10^{-3}$ on high surface supports such as cesium carbonate on activated carbon give improved results at temperatures of 400 to 700° F. and that these catalysts, though somewhat affected by sulfur, nevertheless are sufficiently sulfur resistant so that acceptable conversions of CO to $CO_2$ can be obtained.

In Erdol u. Köhle, V. 6:195 (1953) and V. 9:19 (1956) it has been shown that potassium salts, such as potassium carbonate, are similarly suitable.

SUMMARY

It has now been found that the effect of sulfur on the alkali metal salt catalysts for the water gas reaction can be eliminated by maintaining a concentration of carbon dioxide in the feed at a minimum of 5%, preferably greater than 10%. This can be done by recycling the product with or without separating the hydrogen, by adding extraneous carbon dioxide, or by carrying out the reaction in two stages, the first at a temperature of 700 to 900° F. to effect partial conversion and the second at 500 to 650° F. to complete the reaction under more favorable equilibrium conditions.

PREFERRED EMBODIMENTS

In accordance with the disclosures of the Aldridge application (supra) it is shown that cesium carbonate or any other cesium salt derived from an acid with pKa below $1 \times 10^{-3}$ supported on a carrier having a high surface area is suitable as a catalyst for the water gas shift reaction. It is also shown that these catalysts are affected to some extent by sulfur but that they are sufficiently resistant to sulfur so that acceptable conversions of CO to $CO_2$ can be obtained.

The present invention makes it possible to overcome or eliminate the effect of the sulfur on alkali-metal salts by maintaining the carbon dioxide concentration in the feed gas at least as high as 5%, preferably above 10%. The $CO_2$ concentration in the feed to the shift reaction may be maintained by recycling some of the carbon dioxide product with or without the hydrogen, by adding extraneous carbon dioxide to the feed or it may be maintainted by a two-step operation in which the feed is partially converted to carbon dioxide in a high temperature stage, e.g. 750 to 900° F. using a suitable catalyst such as $Fe_2O_3$ promoted with a small amount of $Cr_2O_3$. When the partial conversion in this first high temperature stage results in a $CO_2$ concentration which equals or exceeds the required amount of $CO_2$ for the second stage, this mixture is then fed to the second stage or low temperature reactor at 400 to 700° F., preferably 500 to 650° F., and passed over a catalyst consisting of an alkali metal salt derived from an acid having an ionization constant of less than $1 \times 10^{-3}$. Suitable alkali metal salts include the carbonate, biphosphate, aluminate, hydroxide, acetate, etc. of sodium, potassium, lithium, rhubidium and cesium. The cesium salts are preferred.

The presence of sufficient carbon dioxide in the feed to the shift reaction results in the tolerance of the alkali metal salt catalyst to sulfur being increased to such an extent that conversions are obtained in the presence of small amounts, for example about 1% or even higher, of sulfur equivalent to those obtained in the absence of sulfur.

The catalyst is generally supported on a carrier, and preferably one with a high surface area. Although the carrier itself is not critical, it is known for catalysis in general, of course, that activity increases with surface area of the support. Therefore, for maximum benefit the surface area of the carrier should be as high as possible. This can be accomplished for example by first partially oxidizing or steaming a cheap low surface area carbon impregnated with the alkali metal compound. Suitable carbon sources are coal coke, petroleum coke, shale oil coke, etc. Multiple impregnations and oxidation or steaming operations may be used to obtain maximum activity. A particularly suitable carrier is activated charcoal, such as coconut charcoal, Columbia L carbon and the like. Activated alumina may also be used as can silica-aluminas, zeolites, etc.

Pressures used during the shift reaction are not critical but may range from atmospheric to 3000 p.s.i.g., with 150 to 1500 p.s.i.g. preferred.

Feed rates are also not critical and may vary from 300 to 3000 volumes of feed per volume of supported catalyst per hour, (v./v./hr.) measured on the basis of dry gas under standard conditions.

Typical results of operations in accordance with the process of this invention are given in the following examples. It will be evident that the examples are merely illustrative of the invention and no undue limitation is imposed thereby.

EXAMPLE 1

Feeds consisting of varying amounts of hydrogen, carbon monoxide, carbon dioxide, steam and $H_2S$ were passed over cesium carbonate and potassium carbonate catalysts at a feed rate of 700 v./v./hr. at STP at various temperatures and under 550 p.s.i.g. The data are shown in Tables I and II.

TABLE I

[Catalyst: 22.6 g. $Cs_2CO_3$ on 21 g. Columbia L Carbon
Operating pressure: 550 p.s.i.g.
Exit gas rate: 700 v./v./hr. at STP (dry gas)
Steam feed rate: 1 mole/mole of product gas]

| Experiment | Temperature of exit gas from Reactor °F. | Feed gas composition, percent [1] | | | Conversion of CO in feed, percent |
|---|---|---|---|---|---|
| | | $H_2S$ | $CO_2$ | CO | |
| 4 | 628 | 0 | 0.13 | 45.86 | 88.4 |
| 5 | 625 | 1.0 | 0.16 | 52.99 | 34.9 |
| 6a | 632 | 1.0 | 19.28 | 11.43 | 75.6 |
| 6b | 632 | 1.0 | 19.28 | 11.43 | 73.8 |
| 6c | 632 | 1.0 | 19.28 | 11.43 | 75.7 |
| 7 | 629 | 1.0 | 33.00 | 10.49 | 72.5 |

[1] Remainder of feed gas is hydrogen.

TABLE II

[Catalyst: 33.6 g. $K_2CO_3$ on 73.5 g. Columbia L Carbon
Operating pressure: 550 p.s.i.g.
Exit gas rate: 700 v./v./hr. at STP (dry gas)
Steam feed rate: 1 mole/mole of product gas]

| Experiment | Temperature of exit gas from Reactor °F. | Feed gas composition, percent [1] | | | Conversion of CO in feed, percent |
|---|---|---|---|---|---|
| | | $H_2S$ | $CO_2$ | CO | |
| 1a | 650 | 0 | 0.13 | 45.86 | 47.8 |
| 1b | 648 | 0 | 0.13 | 45.86 | 46.1 |
| 2a | 649 | 1.0 | 0.16 | 52.99 | 22.7 |
| 2b | 648 | 1.0 | 0.16 | 52.99 | 20.2 |
| 3a | 648 | 1.0 | 33.00 | 10.49 | 47.7 |
| 3b | 648 | 1.0 | 33.0 | 10.49 | 46.1 |

[1] Remainder of feed gas is hydrogen.

The above data show that when the feed contains sulfur, the presence of significant amounts of $CO_2$ suppresses the poisoning effect of the sulfur as indicated by the increased percent conversion of CO in Runs 6a, b, c, and 7 of Table I and 3a of Table II as compared with the conversion obtained in Run 5 of Table I and Runs 2a, b of Table II. The conversions obtained in the presence of $CO_2$ and sulfur are substantially the same as or only slightly less than those obtained in the absence of sulfur. See Run 4 of Table I and Runs 1a and 1b of Table II.

The invention having thus been fully described and illustrated, what is claimed as new, useful and unobvious and desired to be secured by Letters Patent is:

1. In a process for preparing hydrogen in high yields by the water gas shift reaction in which a gas mixture comprising carbon monoxide, steam, and a small amount of sulfur impurities is passed over a water gas shift catalyst comprising an alkali metal salt derived from an acid having an ionization constant of less than $1 \times 10^{-3}$, the improvement which comprises maintaining a carbon dioxide concentration in said gas mixture of greater than 5% to prevent contamination of the catalyst by sulfur.

2. The process of claim 1 in which the carbon dioxide concentration of greater than 5% is maintained by recycling $CO_2$.

3. The process of claim 1 in which the carbon dioxide concentration of greater than 5% is maintained by the additional of extraneous carbon dioxide 4. The process of claim 1 in which the alkali metal salt is cesium carbonate.

5. The process of claim 1 in which the catalyst is $K_2CO_3$.

6. A process for preparing hydrogen in high yields from a gas mixture containing a small amount of sulfur impurities which comprises contacting (a) said gas mixture comprising carbon monoxide, steam, and a small amount of sulfur impurities with a catalyst consisting of $Fe_2O_3$ promoted with a small amount of $Cr_2O_3$ at a temperature of 750 to 900° F. until the concentration of $CO_2$ in the product reaches more than 5% and then contacting the resulting gas mixture with a water gas shift catalyst comprising an alkali metal salt derived from an acid having an ionization constant below $1 \times 10^{-3}$ at a temperature of 400 to 700° F.

7. The process of claim 6 in which the alkali-metal salt is cesium carbonate.

8. The process of claim 6 in which the alkali-metal salt is $K_2CO_3$.

9. The process of claim 1 in which said gas mixture is passed over said catalyst at a temperature of 400 to 700° F.

10. The process of claim 1 in which said catalyst is supported on a carrier.

References Cited

UNITED STATES PATENTS

| 2,147,780 | 2/1939 | Von Kahler | 23—213 |
| 2,465,235 | 3/1949 | Kubicek | 23—213 |
| 2,759,799 | 8/1956 | Berg | 23—213 |
| 2,815,331 | 12/1957 | Ashley et al. | 252—373 |
| 2,960,388 | 11/1960 | Johnson et al. | 23—213 |
| 3,251,652 | 5/1966 | Pfefferle | 23—213 |
| 3,345,136 | 10/1967 | Finneran, et al. | 23—213 |
| 3,361,534 | 1/1968 | Johnson et al. | 23—213 |

FOREIGN PATENTS

| 128,273 | 6/1919 | Great Britain. |

EDWARD STERN, Primary Examiner

U.S. Cl. X.R.

23—150